Figure 1:
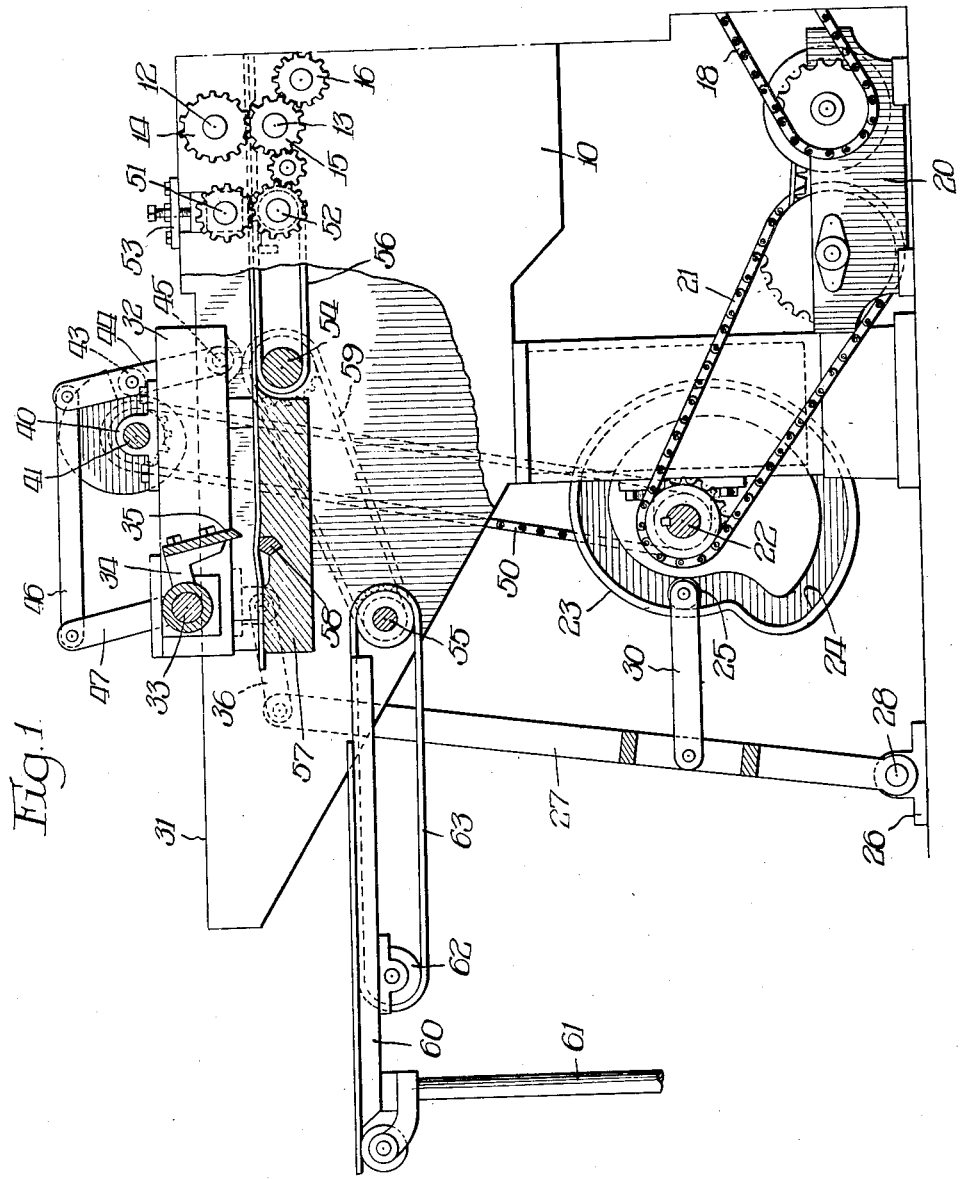

Jan. 30, 1934.  A. E. F. MOONE  1,945,063
CUTTING MECHANISM
Original Filed Nov. 1, 1930  2 Sheets-Sheet 1

Inventor:
Albert E. F. Moone
By Williamson, Hurley, Synor & Knight
Attys

Jan. 30, 1934.  A. E. F. MOONE  1,945,063
CUTTING MECHANISM
Original Filed Nov. 1, 1930  2 Sheets-Sheet 2

Inventor
Albert E. F. Moone.

By Wilkinson, Huxley, Byron & Knight
Attys

Patented Jan. 30, 1934

1,945,063

UNITED STATES PATENT OFFICE 1,945,063

CUTTING MECHANISM

Albert E. F. Moone, Chicago, Ill., assignor to Orenda Corporation, Chicago, Ill., a corporation of Illinois Original application November 1, 1930, Serial No. 492,740. Divided and this application July 25, 1932. Serial No. 624,544

4 Claims. (Cl. 164—43)

The invention relates to cutting mechanism and has for its object the provision of cutting blades which will cut transversely a continuously moving length of material without buckling or damaging the same.

A more specific object is to provide reciprocating cutting mechanism which in one direction will travel in synchronism with the moving material and cut the same transversely without buckling or damaging the portion preceding the blades.

A further object is to provide reciprocating mechanism for carrying a cutting knife and wherein the magnitude of the reciprocations can be varied so that the size of the portion cut by the knife can also be varied to suit conditions.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 2:
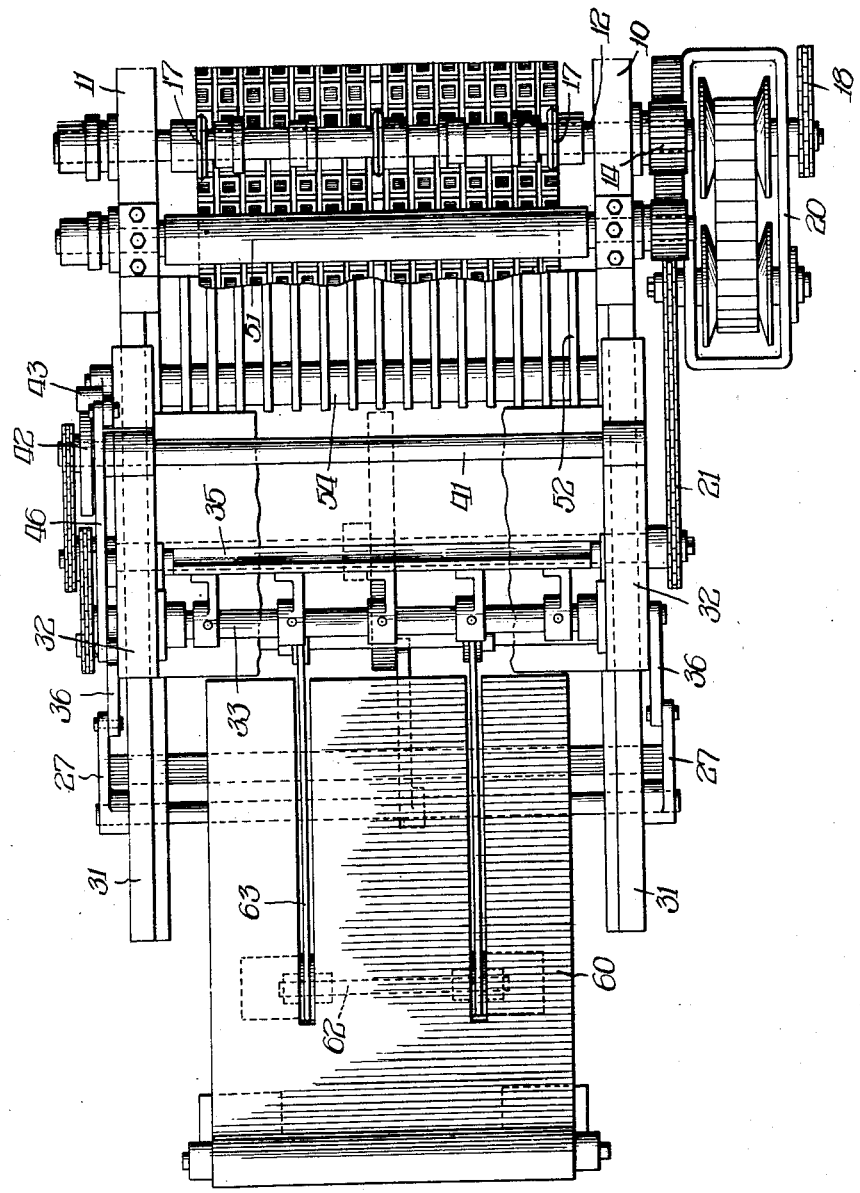

Figure 1 is an elevational view of a portion of a machine showing the same equipped with cutting mechanism constructed in accordance with the present invention; and Figure 2 is a plan view of the apparatus shown in Figure 1.

The present application is a division of applicant's co-pending application Serial No. 492,740 filed November 1, 1930, and therefore the invention is shown in association with a machine for forming packing material and which supplies the material to the cutting mechanism in continuous lengths of desired widths.

The packing forming machine consists essentially of spaced side frames 10 and 11 journalling co-operating transverse shafts 12 and 13 rotated through meshing pinions 14 and 15 and driven by means of the driving pinion 16 having operative connection to any suitable source of power. The shafts mount a number of circular cutters 17 mounted in desired position on the shaft for stripping the material supplied thereto, forming the same into desired widths.

The delivery end of the machine is provided with means for cutting the material transversely and includes a driving belt 18 for transmitting power to a speed reducing mechanism designated in its entirety 20. Belt 21 connects the speed reducing mechanism to a transverse shaft 22 to which is suitably secured a cam 23 formed to provide a cam race 24 in which operates a roller 25. Located upon base 26 are vertical arms 27 pivoted at 28 and having connection to a link 30 which in turn carries at one end the roller 25. The left ends of frames 10 and 11 are formed with an upper bearing surface 31 upon which is mounted for slidable movement members 32, the same being joined by a transverse shaft 33 journalled in the members, spacing the same, and which forms a mounting for arms 34 to which are secured a cutting blade 35. Referring again to arms 27, it will be seen that they are connected at their upper end to links 36 which are pivotally connected at 37 to the slidable members 32, resulting in an actuation of the members in accordance with the movement of the arms 28.

Bearings 40 secured to members 32 provide a mounting for a transverse shaft 41 to which is secured a cam 42 adapted to engage a pin 43 provided on arm 44, the arm being pivoted to one of the members 32 at 45. Suitable links 46 and 47 serve to operatively connect the arm 44 to the shaft 33 journalled in the members. Rotation of shaft 41 is accomplished by providing the shaft with a suitable gear and connecting the same to shaft 22 by means of a belt 50.

As the finished material leaves the cutters 17 it is presented to retarding rolls 51 and 52 suitably journalled within the side frames and driven by means of gearing from the cutter shaft 13. For adjusting the spacing of the retarding rolls a member 53 is provided, mounted in the side frames and functioning to adjust the vertical height of the upper retarding roll by means of suitable adjusting screws. Also mounted within the side frames is a rotatably mounted shaft 54 and a second shaft 55, the former providing in connection with the lower retarding roll means upon which endless tapes 56 are mounted, the tapes functioning as a supporting means for the material. Depending from the members 32 and positioned level with the endless tapes 56 is a block or table member 57 provided in its upper surface with a second cutting blade 58 for co-action with cutting blade 35 to cut the packing material transversely. The material in cut form drops to a table 60 supported by means of a leg 61 and providing a bearing for the shaft 62. Endless tapes 63 are mounted on shafts 62 and 55, the latter being driven by belt 59 from a suitable pulley located on shaft 54. The table 60 therefore forms a delivery mechanism for presenting to the operator individual sheets of the material cut to the desired lengths.

The members 32 have reciprocating movement and in one direction travel against the direction of travel of the continuous length of material supplied by the machine, but in their return movement the members travel at a rate of speed substantially equal to that of the material. The pivotal movement of shaft 33 to cause the cutting movements af blade 35 is so timed that with the members 32 travelling toward the right, Figure 1, the blade 35 will be disengaged from blade 58, but as the members begin their travel toward the left blade 35 is actuated downwardly as the high part of cam 42 engages pin 43 and the movement of blade 35 continues until the travel toward the left of the member is substantially completed.

It is thus seen that engagement of blade 35 with plate 58 will cut the material transversely without causing buckling of the material since the cutting is accomplished with the mechanism travelling in synchronism with that of the material to be cut.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. Material cutting mechanism comprising reciprocating members providing a mounting for a cutter shaft, a cutting blade secured to said shaft, a cam rotatably mounted in said members, means rotating said cam, and connections from the came to the cutter shaft for imparting a cutting movement to the blade.

2. Material cutting mechanism comprising a table member having means mounting the same for reciprocating movement, a knife carried by said table member, an oscillating cutting knife also carried by said table for co-action with said first mentioned knife, cam means for reciprocating said table member on its mounting means, and other cam means operating synchronously therewith for oscillating the cutting knife.

3. Material cutting mechanism comprising a table member having means mounting the same for reciprocating movement, a knife carried by said table member, an oscillating cutting knife also carried by said table for co-action with the first mentioned knife, an operating shaft having cam means for reciprocating said table member on its mounting means, a cam rotatably carried by the table member and operatively connected with said operating shaft, and connections from the cam to the cutting knife for oscillating said knife.

4. Material cutting mechanism comprising a table member having means mounting the same for reciprocating movement, a knife carried by said table member, an oscillating cutting knife also carried by said table for co-action with said first mentioned knife, and an operating shaft having operative connection with said table member and with said oscillating knife, said shaft forming common operating means for reciprocating the table member and for oscillating the cutting knife carried by the table member.

ALBERT E. F. MOONE.